(12) United States Patent
Aurongzeb

(10) Patent No.: US 9,321,101 B2
(45) Date of Patent: Apr. 26, 2016

(54) HIGH-STRENGTH STRUCTURAL ELEMENTS USING METAL FOAM FOR PORTABLE INFORMATION HANDLING SYSTEMS

(71) Applicant: Deeder Mohammad Aurongzeb, Round Rock, TX (US)

(72) Inventor: Deeder Mohammad Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 13/936,078

(22) Filed: Jul. 5, 2013

(65) Prior Publication Data

US 2015/0007925 A1  Jan. 8, 2015

(51) Int. Cl.

| | |
|---|---|
| B32B 37/00 | (2006.01) |
| B32B 5/18 | (2006.01) |
| B22D 7/00 | (2006.01) |
| B22D 25/00 | (2006.01) |
| C22C 21/00 | (2006.01) |
| C22C 18/04 | (2006.01) |
| B32B 3/06 | (2006.01) |
| B32B 15/04 | (2006.01) |
| B32B 37/12 | (2006.01) |
| B32B 13/00 | (2006.01) |
| B32B 15/01 | (2006.01) |
| B32B 19/04 | (2006.01) |
| B32B 37/18 | (2006.01) |

(52) U.S. Cl.
CPC ............. *B22D 7/005* (2013.01); *B22D 25/005* (2013.01); *B32B 3/06* (2013.01); *B32B 5/18* (2013.01); *B32B 15/046* (2013.01); *B32B 37/12* (2013.01); *C22C 18/04* (2013.01); *C22C 21/00* (2013.01); *B32B 13/00* (2013.01); *B32B 15/012* (2013.01); *B32B 19/041* (2013.01); *B32B 19/047* (2013.01); *B32B 37/18* (2013.01); *B32B 2255/062* (2013.01); *B32B 2266/045* (2013.01); *B32B 2305/022* (2013.01); *B32B 2311/24* (2013.01); *B32B 2457/00* (2013.01); *Y10T 29/49989* (2015.01)

(58) Field of Classification Search
CPC ........ B32B 3/30; B32B 9/046; B32B 15/046; B32B 2266/045; B32B 2305/022; B32B 2311/20; B32B 2311/24; B32B 37/144; B32B 2457/00; B32B 3/06; B32B 5/18; B32B 13/00; B32B 15/012; B32B 19/047; B32B 19/041; B32B 37/12; B32B 37/18; B32B 2255/062; B32B 2266/04
See application file for complete search history.

(56) References Cited

U.S. PATENT DOCUMENTS

| | | | |
|---|---|---|---|
| 4,131,053 A | 12/1978 | Ferguson | |
| 4,364,300 A | 12/1982 | Pagano et al. | |
| 5,282,861 A * | 2/1994 | Kaplan | ..................... A61F 2/28 427/2.26 |
| 2003/0232124 A1* | 12/2003 | Medlin | ................... A61L 27/30 427/2.26 |
| 2011/0085929 A1* | 4/2011 | Gupta | ................. A61F 2/30767 419/8 |
| 2012/0024612 A1 | 2/2012 | Ballard | |

FOREIGN PATENT DOCUMENTS

| | | | | |
|---|---|---|---|---|
| DE | 102006053300 A1 * | 5/2008 | ............ | B32B 15/012 |
| EP | 0546211 B2 | 9/1998 | | |
| WO | WO 2010055957 A1 * | 5/2010 | ............ | B22F 3/1125 |

* cited by examiner

*Primary Examiner* — Alex Efta
(74) *Attorney, Agent, or Firm* — Baker Botts L.L.P.

(57) ABSTRACT

Methods for manufacturing a metal foam and a metal foam reinforced back plate may be used to provide high-strength and low weight structural elements in portable information handling systems. A method for manufacturing a metal foam may include selectively adding iridium oxide and ceramic particulate to a light-metal allow to create desired mechanical properties of the metal foam.

9 Claims, 7 Drawing Sheets

HIGH-STRENGTH STRUCTURAL ELEMENTS USING METAL FOAM FOR PORTABLE INFORMATION HANDLING SYSTEMS

BACKGROUND

1. Field of the Disclosure

This disclosure relates generally to portable information handling systems and, more particularly, to high-strength structural elements using metal foam for portable information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Liquid crystal displays ("LCDs") are commonly employed for portable information handling systems configured in the form of laptop, notebook, netbook, and tablet computers, among others. The LCD of a typical laptop computer is mounted within a display housing that is hingeably attached to a base housing that contains the keyboard for the notebook computer. Recently various designs for portable information handling systems have been introduced that combine conventional laptop and tablet functionality and may employ various types of connections to a base housing, including various types hinges and/or removable attachment mechanisms. Furthermore, with the advent of various mobile operating systems supporting touch operation, integration of touch panels within the LCD assembly of portable information handling systems has become highly relevant to satisfying market expectations.

Simultaneously, advancements in packaging design have reduced both the weight and thickness of portable information handling systems. In particular, for market segments that demand ruggedized packaging, such as certain industrial and military applications, achieving sufficient structural integrity while maintaining desirably low weight and compact dimensions becomes more and more challenging. A central aspect of the strength and ruggedness of a portable information handling system involves specific materials and structures used for the chassis and packaging.

Recently metal foam has become available for commercial use, such as in the aircraft industry, where large form factors and very large pore sizes are used. The density of such metal foams can be less than about 40% of an original material based on the pore size. However, with high pore density, a structural element having dimensions corresponding to a small computer system part may be too weak.

Accordingly, it is desirable to have an improved design and a correspondingly improved manufacturing method for high-strength and lightweight structural components in a portable information handling system that provide sufficient structural integrity for reliable operation and use.

SUMMARY

In one aspect, a disclosed method of manufacturing a metal foam for use in a portable information handling system may include preparing a first melt comprising aluminum and lithium and preparing a second melt by adding iridium oxide, ceramic particulate, and calcium carbonate to the first melt. The method may include heating the second melt to evolve gas, wherein a metal foam is generated in the second melt, and cooling the second melt to solidify a metal foam casting. The metal foam casting may have a density of about 0.4 g/cm$^3$.

In another aspect, a disclosed method of manufacturing a metal foam for use in a portable information handling system may include preparing a first melt comprising aluminum and zinc, and preparing a second melt by adding ceramic particulate and calcium carbonate to the first melt. The method may include heating the second melt to evolve gas, wherein a metal foam is generated in the second melt, and cooling the second melt to solidify a metal foam casting. The metal foam casting may have a density of about 0.8 g/cm$^3$.

Other disclosed aspects include a method for manufacturing a metal-foam reinforced back plate for use in a portable information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
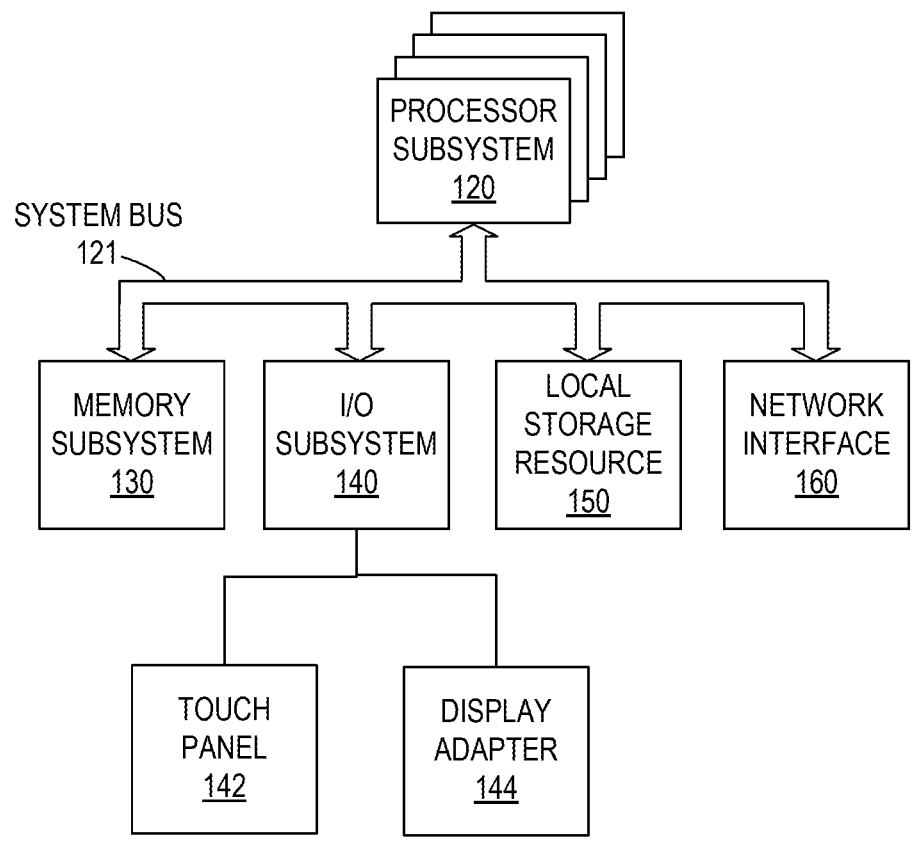
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current portable information handling systems may demand ever thinner and lighter products, without sacrificing strength and stability. However, as a thickness of component assemblies becomes smaller, structural integrity becomes an ever more important issue. As will be described in further detail, the inventors of the present disclosure have developed novel methods and structures disclosed herein for manufacturing a metal foam for structural use in portable information handling systems that provides high strength and low weight to enable an overall compact design.

Particular embodiments are best understood by reference to FIGS. 1, 2, 3, 4, and 5, wherein like numbers are used to indicate like and corresponding parts.

Turning now to the drawings, FIG. 1 illustrates a block diagram depicting selected elements of an embodiment of portable information handling system 100. As shown in FIG. 1, components of portable information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/ within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display for (not shown) that is driven by display adapter 144.

Figure 2:
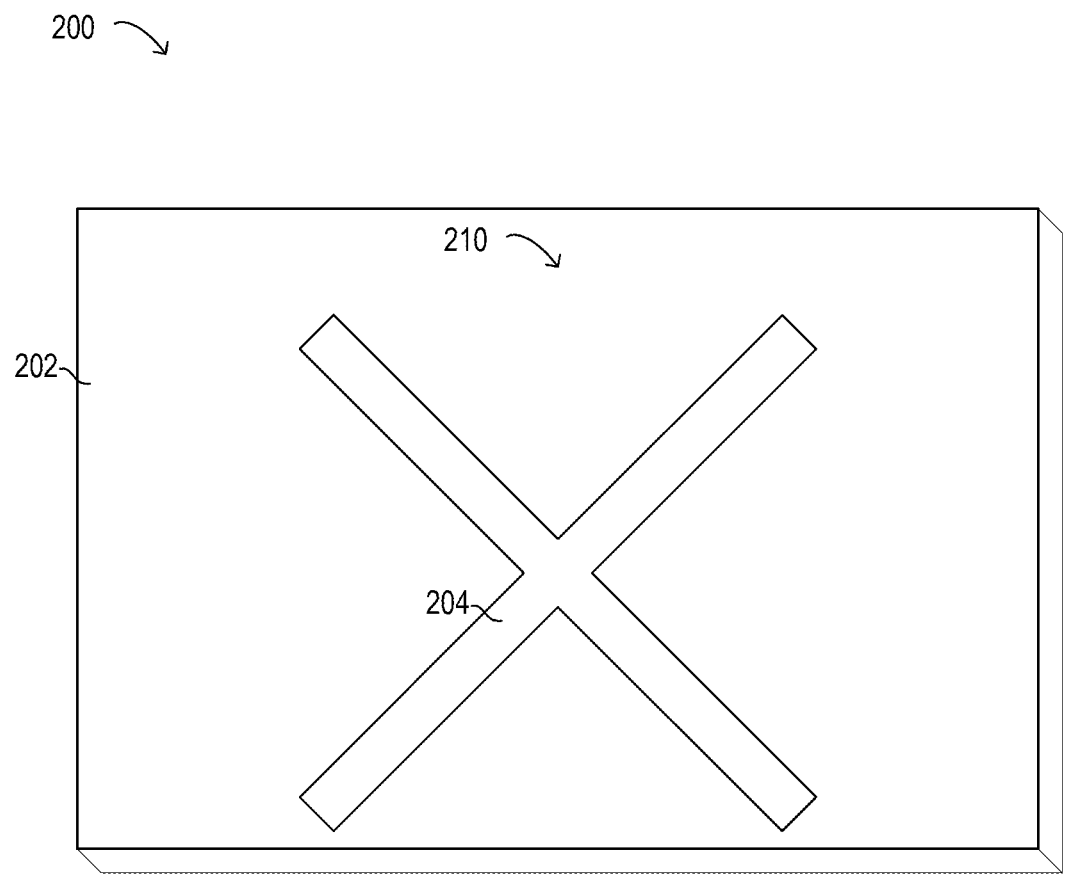
FIG. 2 is a block diagrams of selected elements of an embodiment of a reinforced back plate of a portable information handling system.

Turning now to FIG. 2, a block diagram of selected elements of an embodiment of reinforced back plate 200 is illustrated. In FIG. 2, reinforced back plate 200 is shown from a top view for descriptive clarity and is not drawn to scale. Reinforced back plate 200 may represent a structural element of a portable information handling system (not shown), such as a frame member and/or an external housing portion. In various embodiments, reinforced back plate 200 may represent a laminate structure having multiple layers, of which two layers are shown in FIG. 2. Specifically, reinforced back plate 200 may comprise various additional and/or different layers of metal foam, metal, polymer, polymer blends, carbon fiber, ceramic, and/or other combinations thereof.

In FIG. 2, reinforced back plate 200 is shown comprising back plate 202 and reinforcement layer 204. In various embodiments, reinforcement layer 204 may be a fiber-strengthened composite material, such as a carbon fiber material. In particular embodiments, reinforcement layer 204 represents a metal foam structure, as will be described in further detail herein. Back plate 202 may be a metal plate or a ceramic plate in different embodiments. A composition of either back plate 202 and/or reinforcement layer 204 may be selected based on various criteria, such as a specific product application, product design, market segment, cost, size, weight, thickness, strength, among others. Furthermore, the composition of both back plate 202 and reinforcement layer 204 may be selected based on a bonding performance between these two elements, that is, how a given choice of compositions can be bonded together and a strength of the resulting bond.

For example, in FIG. 2, when reinforced back plate 200 is a ceramic plate, reinforcement layer 204 may be a metal foam comprising aluminum and zinc (see also FIG. 5) and may specifically be tailored (i.e., in shape, thickness, material properties, density, etc.) to reinforce back plate 200 for a given product design. As shown, a shape of reinforcement layer 204 may be selected not to interfere with region 210, where, in different embodiments, a wireless network antenna of the portable information handling system may be situated, but still provide strengthening and support to back plate 202.

Figure 3:
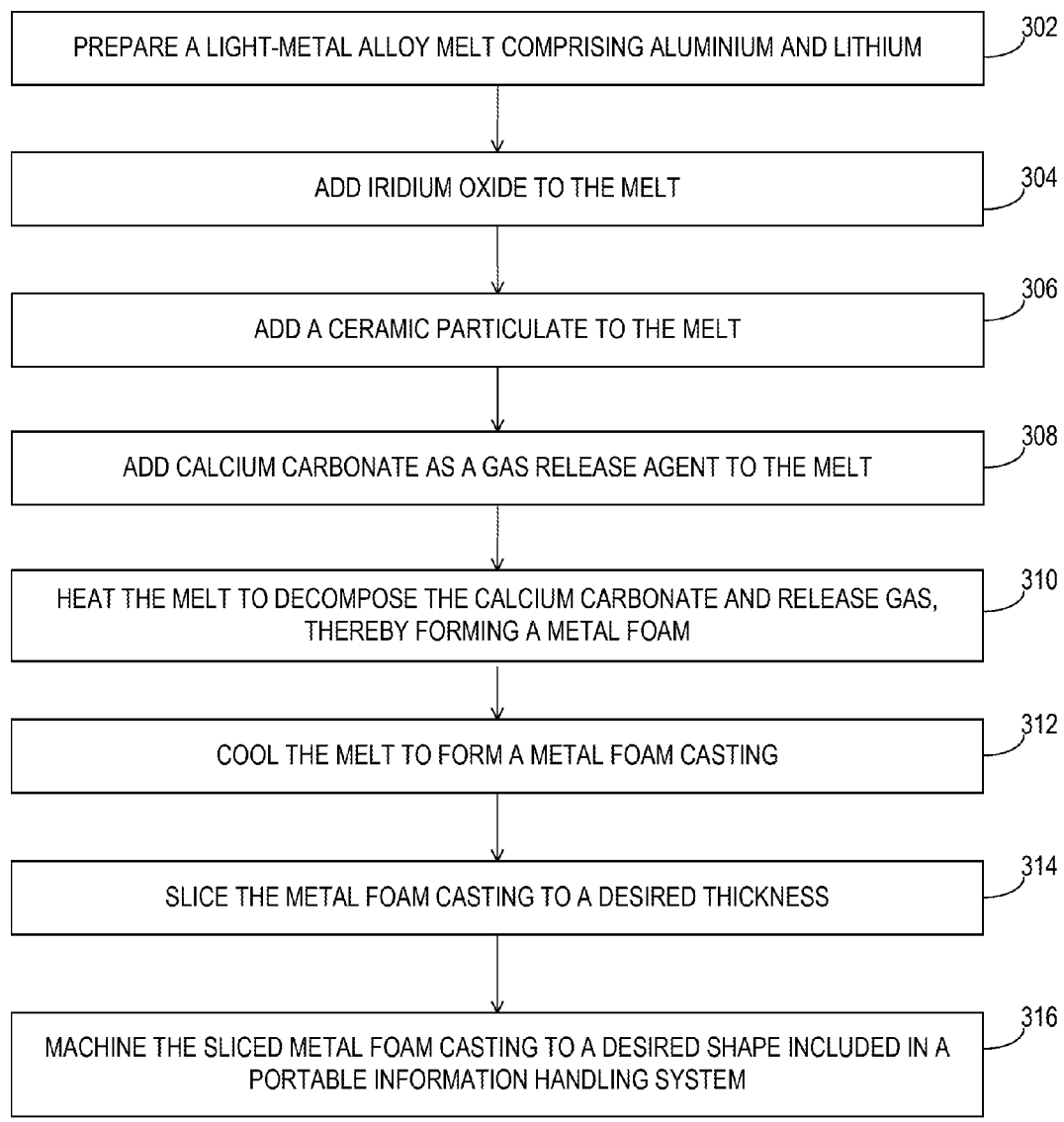
FIG. 3 is flowchart depicting selected elements of an embodiment of a method for manufacturing metal foam for use in a portable information handling system.

Referring now to FIG. 3, a block diagram of selected elements of an embodiment of method 300 for manufacturing a metal foam for use in a portable information handling system is depicted in flowchart form. It is noted that certain operations described in method 300 may be optional or may be rearranged in different embodiments.

Method 300 may begin by preparing (operation 302) a light-metal alloy melt comprising aluminum and lithium. The light-metal allow melt may comprise aluminum A-356 with about 5% by weight lithium, which reduces the weight of the resulting alloy. Then, iridium oxide may be added (operation 304) to the melt. A composition of about 10% by weight iridium oxide ($IrO_2$) may be added to achieve grain hardening of the alloy. Then a ceramic particulate may be added (operation 306) to the melt. The ceramic particulate may comprise about 5% by volume alumina ceramic nanofiber with a median length of less than about 1 micrometer. The ceramic particulate may comprise silicon carbide (SiC) particles having a median particle size of about 1 micrometer. Thus, the metal foam structure may comprise aluminum A-356 base metal with 5% by weight lithium, 10% by weight iridium oxide, and 5% by volume ceramic particulate. Then, calcium carbonate may be added (operation 308) to the melt. The calcium carbonate ($CaCO_3$) may have a median particle size of about 2 micrometers. In certain embodiments, the calcium carbonate may be heated to about 200° C. for about 2 hours to remove moisture and adsorbed gases, which may improve wetting and dispersivity when added to the melt. The melt may be heated (operation 310) to decompose the calcium carbonate and release gas, thereby forming a metal foam. The melt may be heated to about 1,000° C. in operation 310 to promote foam formation in the melt, whereby $CO_2$ and/or $O_2$ gas may be released. The melt may then be cooled (operation 312) to form a metal foam casting. The melt may be cast into a mold, such as for forming an ingot, and then may be air-cooled in operation 312 to preserve the foam structure. Then, the metal foam casting may be sliced (operation 314) to a desired thickness. For example, the metal foam may be sliced to about 2 mm thickness. The sliced metal foam casting may then be machined (operation 314) to a desired shape included in a portable information handling system. The metal foam produced by method 300 may have a density of about 0.4 g/cm$^3$ with a median pore size of about 0.5 mm.

Figure 4:
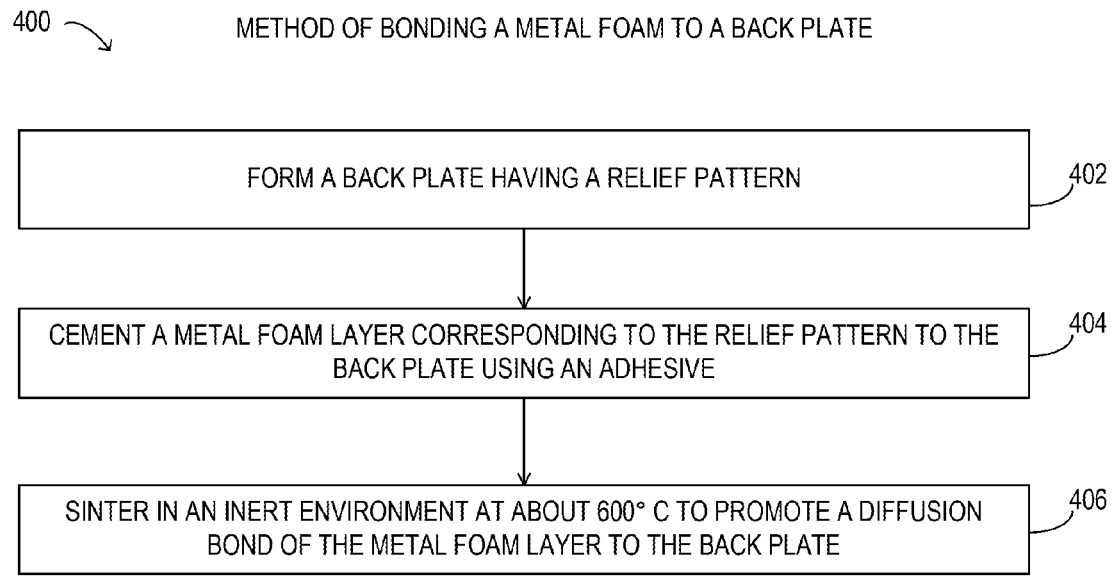
FIG. 4 is flowchart depicting selected elements of an embodiment of a method for bonding a metal foam to a back plate for use in a portable information handling system.

Referring now to FIG. 4, a block diagram of selected elements of an embodiment of method 400 for bonding a metal foam to a back plate, as described herein, is depicted in flowchart form. It is noted that certain operations described in method 400 may be optional or may be rearranged in different embodiments.

In method 400, a back plate having a relief pattern may be formed (operation 402). The forming may involve injection molding, casting, rolling, sintering, etc., for example, depending on a composition of the back plate. The back plate may be a metal plate. The back plate may be a ceramic plate. The relief pattern (see also FIG. 2) may correspond to a desired reinforcement element made of metal foam. Then, a metal foam layer corresponding to the relief pattern may be cemented (operation 404) to the back plate using an adhesive. A reinforced back plate may be formed in operation 404. The reinforced back plate may be sintered (operation 406) in an inert environment at about 600° C. to promote a diffusion bond of the metal foam layer to the back plate.

Figure 5:
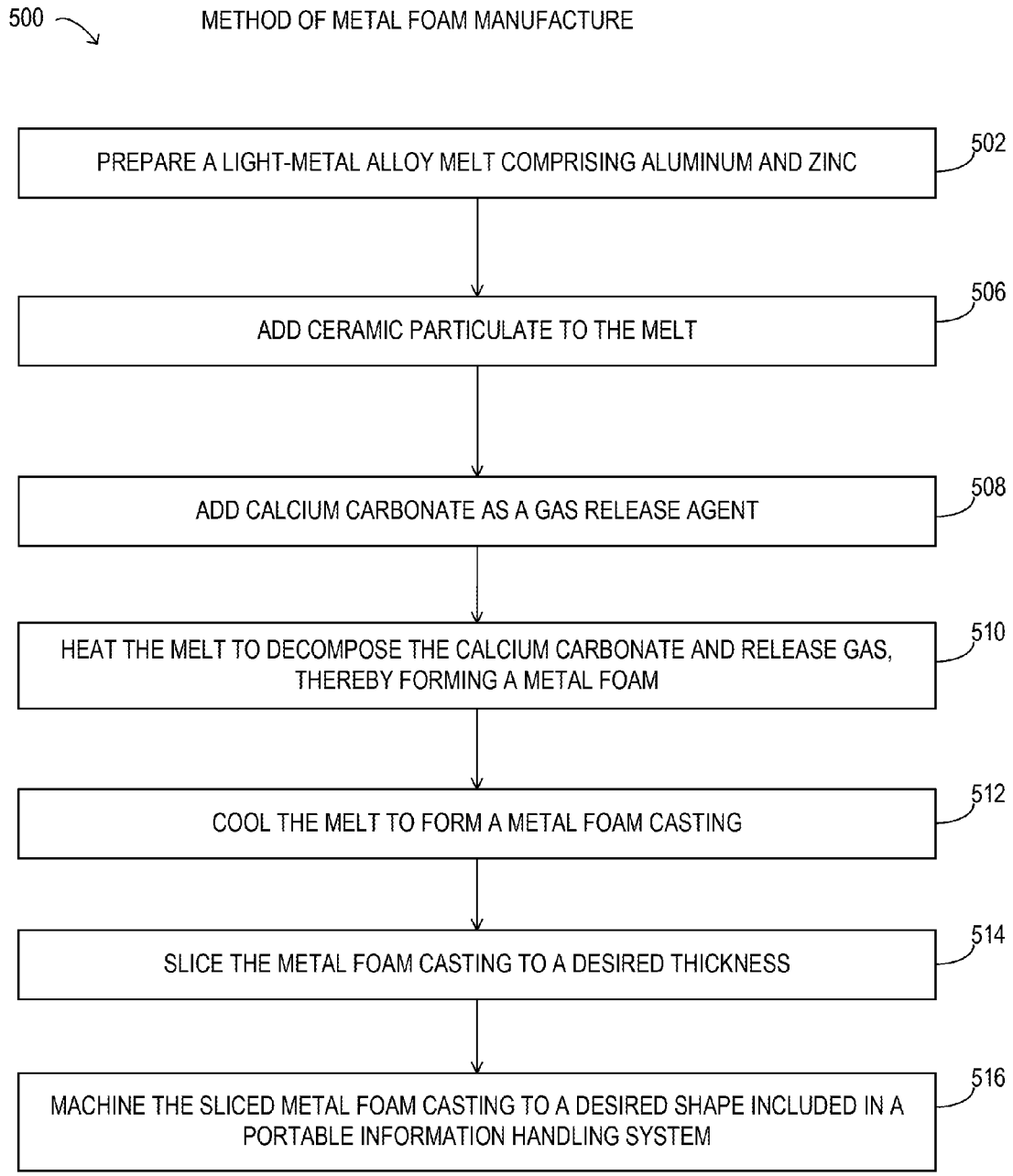
FIG. 5 is flowchart depicting selected elements of an embodiment of a method for manufacturing metal foam for use in a portable information handling system.

Referring now to FIG. 5, a block diagram of selected elements of an embodiment of method 500 for manufacturing a metal foam for use in a portable information handling system is depicted in flowchart form. It is noted that certain operations described in method 500 may be optional or may be rearranged in different embodiments.

Method 500 may begin by preparing (operation 502) a light-metal alloy melt comprising aluminum and zinc. The light-metal allow melt may comprise a Za-22Al alloy. Then a ceramic particulate may be added (operation 506) to the melt. The ceramic particulate may comprise a mixture of about 4% by volume SiC fiber and about 3% by volume alumina ceramic nanofiber with a median length of less than about 1 micrometer. Thus, the metal foam structure may comprise a zinc-aluminum alloy base metal and 7% by volume ceramic particulate. Then, calcium carbonate may be added (operation 508) to the melt. The calcium carbonate ($CaCO_3$) may have a median particle size of about 2 micrometers. In certain embodiments, the calcium carbonate may be heated to about 200° C. for about 2hours to remove moisture and adsorbed gases, which may improve wetting and dispersivity when added to the melt. The melt may be heated (operation 510) to decompose the calcium carbonate and release gas, thereby forming a metal foam. The melt may be heated to about 710°

C. in operation 510 to promote foam formation in the melt, whereby $CO_2$ and/or $O_2$ gas may be released. The melt may then be cooled (operation 512) to form a metal foam casting. The melt may be cast into a mold, such as for forming an ingot, and then may be air-cooled in operation 512 to preserve the foam structure. Then, the metal foam casting may be sliced (operation 514) to a desired thickness. For example, the metal foam may be sliced to about 2 mm thickness. The sliced metal foam casting may then be machined (operation 514) to a desired shape included in a portable information handling system. The metal foam produced by method 500 may have a density of about 0.8 $g/cm^3$ with a median pore size less than about 0.5 mm.

Figure 6:
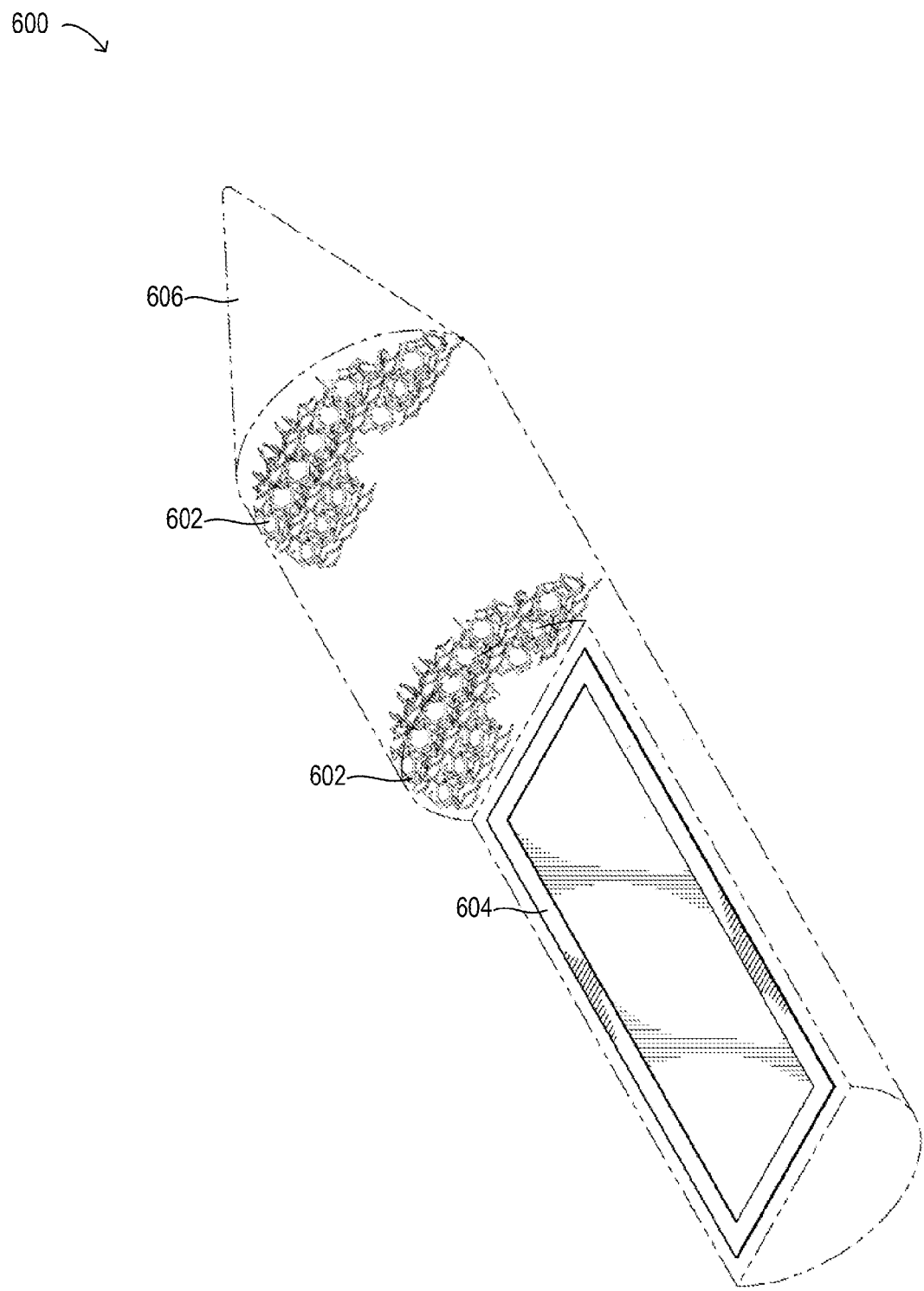
FIG. 6 is a block diagram of selected elements of an embodiment of a portable information handling system incorporating metal foam.

Turning now to FIG. 6, a block diagram of selected elements of an embodiment of information handling system 600 is illustrated. In FIG. 6, information handling system 600 may represent a handheld computing device in a form factor of a stylus, such as a pen or another type of writing instrument. As shown, information handling system 600 may include display 604, which may include a touch panel for user interaction. Information handling system 600 may have housing 606 that is reinforced using metal foam members 602, which may add structural rigidity to housing 606. In certain embodiments, housing 606 may be formed with metal foam members 602 integrated therein. Although two transverse instances of metal foam members 602 are shown in FIG. 6, it will be understood that other arrangements and numbers of metal foam members may be used in various embodiments.

Figure 7:
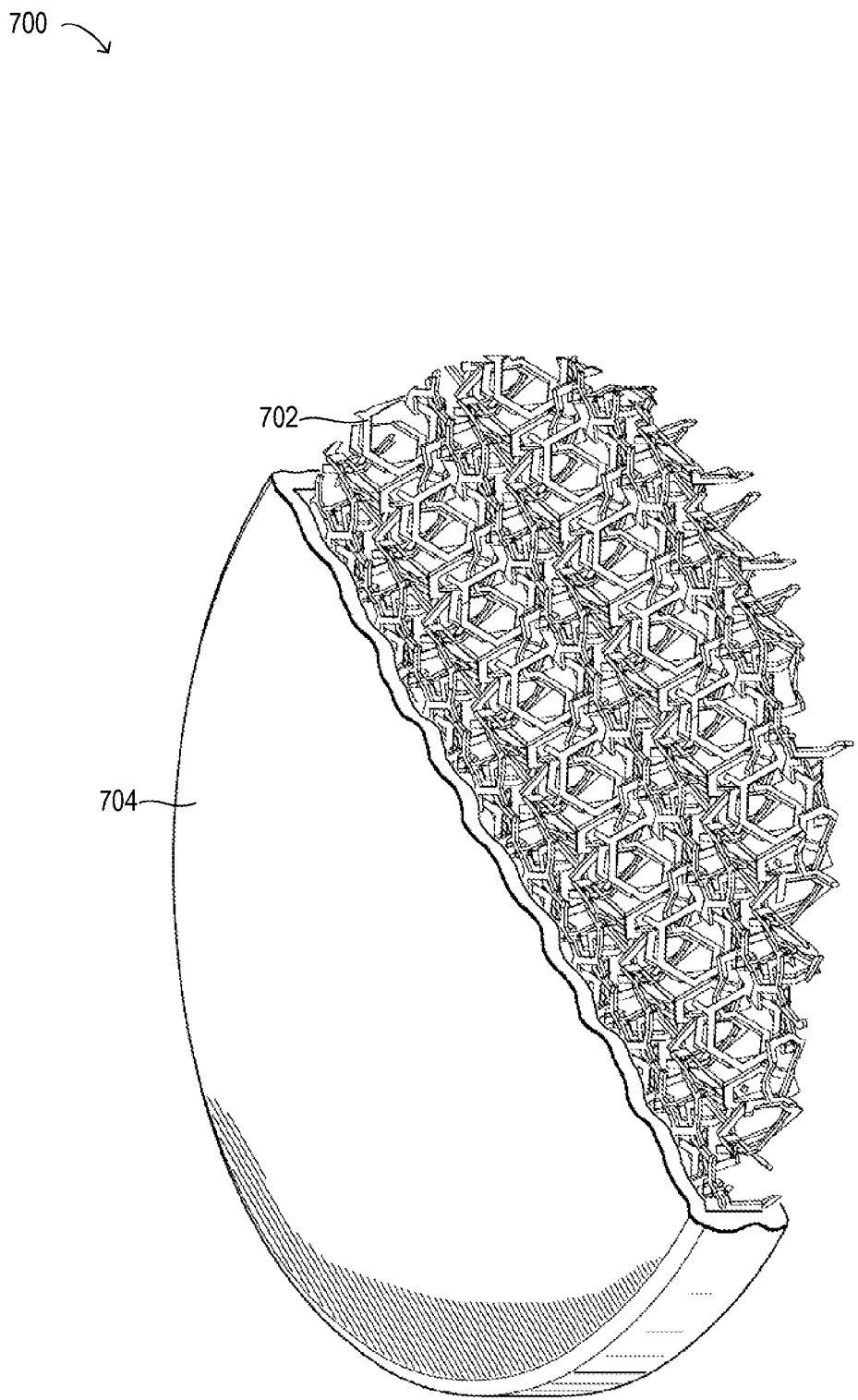
FIG. 7 is a block diagram of selected elements of an embodiment of a portable information handling system incorporating metal foam.

Turning now to FIG. 7, a block diagram of selected elements of an embodiment of information handling system 700 is illustrated. In FIG. 7, information handling system 700 may represent a handheld computing device in a form factor having housing 704 that is oval-shaped. Information handling system 700 may include a display and other components (not shown), while housing 704 may be reinforced using metal foam 702, which may add structural rigidity to housing 704. In certain embodiments, housing 704 may be formed with metal foam 702 integrated therein, for example, by being molded around metal foam 702.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for manufacturing a metal-foam reinforced back plate for use in a portable information handling system, comprising:

forming a back plate having a relief pattern;

cementing a metal foam structure corresponding to the relief pattern to the back plate using an adhesive to form the metal-foam reinforced back plate; and sintering the metal-foam reinforced back plate under an inert gas at 600° C., wherein at least a portion of the metal-foam structure is diffusion bonded with the back plate, wherein the metal foam structure comprises:

aluminum base metal with lithium;

iridium oxide; and ceramic particulate, wherein the metal foam structure has a density of about 0.4 $g/cm^3$, and wherein the back plate is a metal plate.

2. The method of claim 1, wherein the metal foam structure comprises:

aluminum A-356 base metal with 5% by weight lithium;

10% by weight iridium oxide; and

5% by volume ceramic particulate, wherein the metal foam structure has a density of 0.4 $g/cm^3$, and wherein the back plate is a metal plate.

3. The method of claim 2, wherein the ceramic particulate comprises at least one of alumina nanofiber and silicon carbide particles.

4. The method of claim 2, wherein the ceramic particulate has a median size of less than 1 micrometer.

5. The method of claim 1, wherein the metal foam structure is 2 mm thick, and wherein the metal foam comprises pores having a median size of 0.5 mm.

6. A method for manufacturing a metal-foam reinforced back plate for use in a portable information handling system, comprising:

forming a back plate having a relief pattern;

cementing a metal foam structure corresponding to the relief pattern to the back plate using an adhesive to form the metal-foam reinforced back plate; and sintering the metal-foam reinforced back plate under an inert gas at 600° C., wherein at least a portion of the metal-foam structure is diffusion bonded with the back plate, wherein the metal foam structure comprises:

a zinc-aluminum alloy base metal; and ceramic particulate, wherein the metal foam structure has a density of about 0.8 $g/cm^3$, and wherein the back plate is a ceramic back plate.

7. The method of claim 6, wherein the ceramic particulate comprises a mixture of alumina nanofiber and silicon carbide particles.

8. The method of claim 6, wherein the ceramic particulate has a median size of less than 1 micrometer.

9. The method of claim 6, wherein the metal foam structure comprises:

7% by volume of the ceramic particulate, wherein the metal foam structure has a density of 0.8 $g/cm^3$.

* * * * *